US012682466B2

(12) United States Patent　(10) Patent No.: US 12,682,466 B2
Polak et al.　(45) Date of Patent: Jul. 14, 2026

(54) METHOD FOR ACQUIRING A MAGNETIC RESONANCE IMAGE DATASET

(71) Applicants: Siemens Healthineers AG, Forchheim (DE); The General Hospital Corporation, Boston, MA (US)

(72) Inventors: Daniel Polak, Erlangen (DE); Stephen Farman Cauley, Winchester, MA (US); Lawrence L. Wald, Cambridge, MA (US)

(73) Assignees: Siemens Healthineers AG, Forchheim (DE); The General Hospital Corporation, Boston, MA (US)

( * ) Notice: Subject to any disclaimer, the term of this patent is extended or adjusted under 35 U.S.C. 154(b) by 238 days.

(21) Appl. No.: 18/657,527

(22) Filed: May 7, 2024

(65) Prior Publication Data

US 2024/0386576 A1　Nov. 21, 2024

Related U.S. Application Data

(60) Provisional application No. 63/467,086, filed on May 17, 2023.

(51) Int. Cl.
*G06T 7/00*　(2017.01)
*G06T 5/20*　(2006.01)
*G06T 7/20*　(2017.01)

(52) U.S. Cl.
CPC .................. G06T 7/20 (2013.01); G06T 5/20 (2013.01); *G06T 2207/10088* (2013.01); *G06T 2207/30241* (2013.01)

(58) Field of Classification Search
CPC ............. G06T 5/20; G06T 2207/10088; G06T 2207/30241; G01R 33/5611;
(Continued)

(56) References Cited

U.S. PATENT DOCUMENTS

| | | | | |
|---|---|---|---|---|
| 11,143,730 B2 * | 10/2021 | Wang | .................. | G01R 33/5611 |
| 2017/0199258 A1 * | 7/2017 | Beck | .................. | G01R 33/4828 |

(Continued)

OTHER PUBLICATIONS

Haskell et al, Targeted Motion Estimation and Reduction (TAMER): Data Consistency Based Motion Mitigation for MRI using a Reduced Model Joint Optimization, IEEE, vol. 37, No. 5, pp. 1253-1265 (Year: 2018).*

(Continued)

*Primary Examiner* — Xiao Liu
(74) *Attorney, Agent, or Firm* — Lempia Summerfield Katz LLC

(57)　ABSTRACT

A method for acquiring a magnetic resonance image dataset of a subject is disclosed, wherein k-space is sampled during the acquisition in a plurality of k-space lines having different positions in the phase encoding direction. The method includes: sampling a first part of k-space by acquiring a number of k-space lines; determining a subject motion trajectory including motion data of the subject at one or several time points during the acquisition; associating the motion data with the positions along the phase encoding direction(s) of the k-space lines which were or will be acquired at the time points of the motion data; analyzing the distribution of the motion data in k-space and calculating a metric of variation of the motion data; and selecting the positions of the k-space lines of a next part of k-space to be acquired in the imaging protocol, depending on the metric of variation.

16 Claims, 5 Drawing Sheets

(58) Field of Classification Search
CPC .......... G01R 33/56308; G01R 33/5615; G01R 33/482; G01R 33/4822; G01R 33/5676; G01R 33/567
See application file for complete search history.

(56) References Cited

U.S. PATENT DOCUMENTS

| | | |
|---|---|---|
| 2021/0325500 A1 | 10/2021 | Uhlemann et al. |
| 2021/0373105 A1 | 12/2021 | Polak et al. |

OTHER PUBLICATIONS

Polak et al., Scout accelerated motion estimation and reduction (SAMER), Magn. Reson. Med., vol. 87, Issue 1, pp. 163-178, Jan. 2022.*

Cordero-Grande, et al. "Sensitivity Encoding for Aligned Multishot Magnetic Resonance Reconstruction" IEEE Transactions on Computational Imaging, vol. 2, No. 3, Sep. 2016, pp. 266-280. (15 pages).

Cordero-Grande, et al., "Three-dimensional motion corrected sensitivity encoding reconstruction for multi-shot multi-slice MRI: application to neonatal brain imaging. Magnetic Resonance in Medicine", 79. Jg., Nr. 3, pp. 1365-1376 (2018).

Hamilton, et al.: "Recent Advances in Parallel Imaging for MRI", Prog. Nucl. Magn. Reson. Spectrosc; 101, pp. 71-95 (2017).

Haskell, et al. "Targeted Motion Estimation and Reduction (TAMER): Data Consistency Based Motion Mitigation for MRI using a Reduced Model Joint Optimization" IEEE, vol. 37, Nr. 5, pp. 1253-1265 (2018).

Loktyushin A, et al. "Blind multirigid retrospective motion correction of MRimages." Magn Reson Med.; 73(4): pp. 1457-1468 (2015).

Polak et al., "Motion guidance lines for robust data consistency-based retrospective motion correction in 2D and 3D MRI", Magnetic Resonance in Medicine; pp. 1777-1790 (Feb. 6, 2023).

Polak et al., "Scout accelerated motion estimation and reduction (SAMER)," vol. 87, Issue 1, pp. 163-178 (2022).

Pruessmann, et al., "SENSE: Sensitivity Encoding for Fast MRI", Magnetic Resonance in Medicine 42: pp. 952-962 (1999).

* cited by examiner

Sequential shot ordering

Hierarchical shot ordering

FIG 4

$$[\hat{\chi}] = \mathrm{argmin}_{\chi} \left\| E_{\hat{\theta}}\chi - s \right\|_2^2$$

$$[\hat{\theta}] = \mathrm{argmin}_{\theta} \left\| E_{\theta}\hat{\chi} - s \right\|_2^2$$

$$[\hat{\theta}_i] = \mathrm{argmin}_{\theta i} \left\| E_{\theta i}\hat{\chi} - s_i \right\|_2^2 \quad \text{— } 54$$

$$[\hat{\chi}] = \mathrm{argmin}_{\chi} \left\| E_{\hat{\theta}}\chi - s \right\|_2^2 \quad \text{— } 56$$

METHOD FOR ACQUIRING A MAGNETIC RESONANCE IMAGE DATASET

The present patent document claims the benefit of U.S. Provisional Patent Application No. 63/467,086, filed May 17, 2023, which is hereby incorporated by reference in its entirety.

TECHNICAL FIELD

The disclosure relates to a method for acquiring a magnetic resonance image dataset, to a magnetic resonance imaging apparatus, and to a computer program.

BACKGROUND

Independent of the grammatical term usage, individuals with male, female, or other gender identities are included within the term.

Patient motion may degrade the diagnostic quality of magnetic resonance (MR) exams. Fast imaging protocols may reduce the impact of motion. For example, parallel imaging techniques, as summarized in J. Hamilton et al., "Recent Advances in Parallel Imaging for MRI," Prog. Nucl. Magn. Reson. Spectrosc., vol. 101, pp. 71-95, 2017, exploit the properties of modern multi-channel coil arrays to separate aliased pixels in the image domain or to estimate missing k-space data, using knowledge of nearby acquired k-space points, in order to allow scan time reduction by sampling a smaller number of phase encoding lines in k-space.

Some magnetic resonance imaging (MRI) motion correction techniques involve measuring the motion by tracking devices or navigator acquisitions.

By contrast, retrospective methods correct for motion artefacts after the data acquisition without disruptions to the sequence timing or inclusion of additional hardware. By including motion operations into the MR forward model, these techniques account for the patient's motion in the final image reconstruction and therefore reduce motion artefacts through improved model agreement. Especially data-driven retrospective correction techniques allow for the motion data to be derived from the acquired k-space data itself. In the case of parallel imaging, this is facilitated because the complex sensitivity profiles of multi-channel coil arrays inherently encode the patient position into the acquired k-space data. For multi-shot acquisitions, the goal in retrospective motion correction techniques is to extract the per shot motion parameters and the motion-free image simultaneously. This may be accomplished by either minimizing an image quality metric, such as image entropy, or by minimizing the data consistency error of a parallel "imaging+motion" forward model, as described in L. Cordero-Grande et al., "Three-dimensional motion corrected sensitivity encoding reconstruction for multi-shot multi-slice MRI: Application to neonatal brain imaging," Magn. Reson. Med., vol. 79, no. 3, pp. 1365-1376, 2018; J. Cordero-Grande et al., "Sensitivity Encoding for Aligned Multishot Magnetic Resonance Reconstruction," IEEE Trans. Comput. Imaging, vol. 2, no. 3, pp. 266-280, 2016; and M. W. Haskell et al., "TArgeted Motion Estimation and Reduction (TAMER): Data consistency based motion mitigation for MRI using a reduced model joint optimization," IEEE Trans. Med. Imaging, vol. 37, no. 5, pp. 1253-1265, 2018. For the latter, the motion and image vector are jointly estimated via an inversion of the non-linear forward model. This corresponds to a large-scale non-linear optimization problem that may be computationally very expensive. Previously proposed methods alternate between optimizing just the image or the motion parameters while assuming the other to be fixed (see L. Cordero-Grande in Magn. Reson. Med.), instead of updating all optimization variables at once. Nevertheless, repeated updates of the imaging voxels lead to excessive computation that prohibits its use in clinical settings. When the "imaging+motion" model and the underlying imaging protocol also includes parallel imaging techniques that make use of the complex sensitivity profiles of multi-channel coil arrays, such as SENSE (SENSitivity Encoding) or ASSET (Array coil Spatial Sensitivity Encoding), it is referred to as "SENSE+motion" model.

In "Scout accelerated motion estimation and reduction (SAMER)," Magn. Reson. Med., vol. 87, pp. 163-178, 2022, D. Polak et al. propose a technique that utilizes a single rapid scout scan to drastically reduce the computation cost of motion estimation. The scout image contains center of k-space information that is compared against the k-space data of the actual MR acquisition for each shot, to derive the subject's motion. This corresponds to registration of the k-space data with the scout image in k-space. This strategy is used to completely avoid the alternating optimization of subject motion and image volume, which is otherwise required in retrospective motion correction techniques. In the SAMER-technique, a motion trajectory of the subject is first estimated, and the motion trajectory is then used in a motion-aware parallel image reconstruction, using e.g., a "SENSE+motion" model, to yield the motion-mitigated image. This reduces the computational costs by several orders of magnitude, when compared to established alternating optimization method.

However, despite the computational benefits of the SAMER-technique, the retrospective correction of motion artefacts especially in two-dimensional (2D) turbo spin-echo (TSE) or fast spin-echo (FSE) imaging protocols remains challenging, because patient motion may lead to gaps in k-space that cannot be corrected for retrospectively. In 2D sequences, such gaps in k-space may require interpolation between slices, which does not work well for thick slices. Also, spin history effects may impede retrospective motion correction. The result is that motion artefacts are still visible after retrospective motion correction techniques in the shape of ringing or blurring artefacts. The effects of k-space gaps and thick-slice interpolation may in theory be overcome by re-acquiring the missing data, but this would mean an increase of the acquisition duration, which would not find widespread clinical acceptance.

SUMMARY AND DESCRIPTION

It is therefore an object of the disclosure to provide a method for acquiring a magnetic resonance image dataset of a subject, which improves the quality of the retrospectively motion corrected image, in particular which reduces blurring and/or ringing artefacts caused by gaps in k-space due to subject motion during the image acquisition.

The scope of the present disclosure is defined solely by the appended claims and is not affected to any degree by the statements within this summary. The present embodiments may obviate one or more of the drawbacks or limitations in the related art.

This object is met or exceeded by the acquisition method, the method for generating a motion-corrected MRI dataset, the MRI apparatus, and the computer program as described and claimed herein.

According to a first aspect, the disclosure provides a method for acquiring a magnetic resonance image dataset of an subject using an imaging protocol in which spatial encoding is performed using phase encoding gradients along at least one spatial direction, and frequency encoding gradients along another spatial direction, wherein k-space is sampled during the acquisition in a plurality of k-space lines oriented along the frequency encoding direction, and having different positions in the at least one phase encoding direction. The method includes: (a) sampling a first part of k-space by acquiring a number of k-space lines under the imaging protocol; (b) determining a subject motion trajectory including motion data of the subject at one or several time points during the acquisition; (c) associating the motion data with the positions along the phase encoding direction(s) of the k-space lines which were or will be acquired at the time points of the motion data; (d) analyzing the distribution of the motion data in k-space and calculating a metric of variation of the motion data; and (e) selecting the positions of the k-space lines of a next part of k-space to be acquired in the imaging protocol, depending on the metric of variation.

The disclosure has recognized that the quality of retrospective motion correction depends strongly on the order in which k-space lines are acquired, and that different kinds of motion require different sampling orders. "Sampling order," "order," "ordering," or "shot ordering" in this disclosure refers to the temporal order in which k-space lines are acquired in the at least one phase-encoding direction, and in particular the order in which the shots are acquired.

In particular, it is advantageous for retrospective motion correction if the k-space lines acquired during different motion states (e.g., different positions) of the subject are distributed over the k-space—rather than one region of k-space being acquired in one motion state, and an adjacent region of k-space being acquired in another motion state, because this may lead to gaps or steps in the k-space data, which cause ringing artefacts in the reconstructed image. The disclosure therefore introduces an act of analyzing how different motion states are distributed over the k-space and calculating a respective metric of variation. The metric of variation is low if the k-space lines associated with different motion states are well distributed over k-space.

This metric of variation is used dynamically, e.g., during the acquisition of the imaging protocol, to select the k-space positions of the next k-space lines to be acquired. In particular, the k-space positions are chosen so that the metric of variation is low, e.g., as low as possible.

The "position in k-space" may refer to the position of k-space lines along the phase encode direction(s), wherein there may be one phase encode direction in a 2D acquisition and two phase encode directions in a 3D acquisition.

In T2-weighted 2D TSE sequences, for example, one may select the number and spacing of k-space lines in each echo train (also referred to as "shot") to remain fixed, in order to preserve contrast. In each shot of such 2D TSE imaging protocol, k-space lines may be acquired in equal distances/spacings across k-space. For example, every $10^{th}$ k-space line is sampled in one shot, one after the other from one side of the k-space plane to the other. Thus, 10 shots would be required to sample all of k-space in this imaging protocol. The order in which these 10 shots are acquired is normally fixed when the imaging protocol starts and may be one of the following:

In a so-called "sequential" order, the 10 shots would be acquired such that each shot samples the k-space lines adjacent to the k-space lines acquired in the previous shot.

For example, in the first shot one would sample the $1^{st}$, $11^{th}$, $21^{st}$, $31^{st}$, . . . line of k-space, and in the second shot one would sample the $2^{nd}$, $12^{th}$, $22^{nd}$, $32^{nd}$, . . . line of k-space.

In a so-called "hierarchical" order, k-space would be filled such that the remaining gaps in k-space are minimized after each shot. For example, in the first shot one would sample the $1^{st}$, $11^{th}$, $21^{st}$, $31^{st}$, . . . line of k-space, and in the second shot one would sample the $6^{th}$, $16^{th}$, $26^{th}$, $36^{th}$, . . . , etc. line of k-space.

The proposed method dynamically alters the next k-space position of the imaging protocol, based on the previously estimated motion data and a metric of variation calculated from the motion data. This requires motion information to be available in near real-time, as provided e.g., by the SAMER method. According to an embodiment of the method, the order of acquiring the shots required for the imaging protocol is changed dynamically while the imaging protocol is being executed. For example, one may change between a sequential order and a hierarchical order.

This improves the quality of the retrospectively motion corrected image, because a relationship between the sampling order has been found, for example, in 2D thick-slice TSE, and the robustness of the motion correction. In a simulation across a number of different clinical motion trajectories, SAMER motion correction was performed using ground truth motion parameters. The performance using sequential and hierarchical orderings was measured by root-mean square error (RMSE) with respect to the ground truth image. It was found that a hierarchical ordering led to improved motion correction for many, but not all trajectories. In particular, a hierarchical ordering is better for step motion, while the sequential ordering is superior for nodding/breathing motion. This is because retrospective motion correction works best if each motion state is represented in all parts of k-space, while gaps in k-space should be avoided. In case of a step motion, where the patient moves once or a few times in a "step" during the imaging protocol, a hierarchical order works well, whereas a sequential order may lead to larger gaps in k-space. By contrast, a periodical movement such as breathing may counteract the permutations of a hierarchical ordering scheme, so that the sequential order may lead to better results.

Because a single, fixed sampling order does not work best across all typical patient motions, the disclosure proposes to dynamically (while the imaging protocol is being executed) choose the positions of the next k-space lines, in particular of the next shot, in order to minimize motion sensitivity and thereby improve the correction performance. The method uses an easy-to-compute metric of variation that serves as a proxy for motion sensitivity and relies only on motion trajectory information.

A dynamic algorithm for rearranging the sampling order of the subsequent k-space lines, in particular for rearranging the order in which the shots of a TSE sequence are acquired, has been developed. The algorithm uses a running update of the metric of variation determined from the subject motion trajectory including motion data, which have been determined "on-the-fly" (e.g., in real time), so that motion data, e.g., a motion state, is available for each part of k-space immediately after that part of k-space has been acquired, for example by the SAMER motion estimates. The most recent estimate of the motion data may be used to determine which of the remaining k-space positions are most likely to reduce the temporal motion variance. Those k-space positions are then acquired as the next part of k-space.

The method may be executed on any medical or other MRI apparatus. The subject may be a human or animal, in particular part of a patient to be examined. The MRI dataset may be taken from a part of the subject, (e.g., the head), or a part that may be subject to breathing motion, (e.g., the thorax or abdomen). It may be a three-dimensional (3D) dataset, acquired using two phase encoding directions, or, e.g., a two-dimensional (2D) dataset, acquired using one phase encoding direction.

The imaging protocol may be any MR imaging protocol or sequence in which several k-space lines are acquired having different positions in the phase encoding direction(s).

The imaging protocol may use a spin-echo or gradient echo sequence. It may be a TSE or TSE-type sequence, for example, having T1-weighted, T2-weighted, or other contrast. It may be a non-steady-state sequence, e.g., one in which the signal intensity or contrast varies over an echo train in particular due to T1 and/or T2 relaxation, e.g., MPRAGE (Magnetization Prepared Rapid Gradient Echo Imaging). It may also be an imaging protocol in which two images are acquired shortly one after the other after the same preparation pulse with different contrasts, such as MP2RAGE. It may be a SPACE sequence (Sampling Perfection with Application optimized Contrast using different flip angle Evolution) or FLAIR (Fluid-attenuated inversion recovery) sequence. The implementation of the disclosure does not change the sequence timings, only the order of in which k-space lines are acquired is altered. The method may preserve the contrast of the imaging protocol; however, the appearance of motion artefacts is improved.

According to the method, a first part of k-space is first sampled, using the imaging protocol. The first part may include a plurality of k-space lines. The k-space lines need not be adjacent to one another. In the case of TSE sequences, for example, the k-space lines that are acquired one after the other in each shot may be arranged at a fixed spacing from each another. The first part of k-space may cover k-space lines distributed over the whole k-space plane (or phase encoding plane in case of 3D imaging). The first part is in particular acquired using the "normal" sampling order prescribed by the imaging protocol. It may include 8 to 100 k-space lines or 10 to 30 k-space lines, for example.

During or directly after the first part of k-space has been sampled, a subject motion trajectory including motion data of the subject at one or several time points during the acquisition is determined. The subject motion trajectory may also be referred to as patient motion trajectory. It includes motion data, which may be any kind of data that describes the motion of the subject or patient during the acquisition, in particular of the first part of k-space, or of the whole imaging protocol. The motion data in particular gives information on the motion state, e.g., positional information, of the part of the subject that is being imaged, at, e.g., at least two time points. The method acts of analyzing the motion data and selecting the positions of the k-space lines of the next part of k-space may be repeated several times during the imaging protocol, until all parts of k-space have been sampled.

The motion data may be acquired in addition to the magnetic resonance data. The motion data may be a pilot tone signal or data calculated therefrom. Any other type of motion detection may also be used. For example, navigator acquisitions (vnavs) may be used to obtain motion data from the subject while the imaging protocol is being carried out. Alternatively, one or more cameras, (e.g., optical or infrared cameras), may be used to take a video stream of images from the subject during the acquisition of the first part (and next parts) of k-space. The motion data may be extracted from the video stream.

In another embodiment, the motion data is estimated from the already acquired k-space data using a retrospective motion correction technique such as SAMER. For example, a small number of guidance lines acquired together with the first part of k-space may be compared against a low-resolution scout image to estimate motion parameters, as explained in more detail below.

The motion data may include a "motion state" for each time point, wherein a motion state is a description of the position and orientation of the part of the subject that is being imaged, at that time point. It may include one or several parameters describing the motion or the position, in particular translational and rotational parameters. A motion state may also include information on the severity of motion at that time point. In an embodiment, a motion state includes three translational and three rotational parameters. Non-rigid motion parameters may also be used. A subject motion trajectory may mean a time series of several motion states held by the subject one after the other. Depending on the time resolution with which the subject motion may be estimated, one or several motion states may be included in the motion trajectory of the subject during the acquisition of the first part of k-space.

The motion data determined for each time point is then associated with the position of the k-space line in the phase encoding direction which was or will be sampled at that time point, e.g., when the subject was or will be at the motion state reflected in the motion data. Thereby, the disclosure allows to correlate motion with the positions in k-space which are affected by the motion, and thereby to provide that the order in which the further parts of k-space are sampled is optimized to achieve the best possible correction of the motion that has so far occurred.

In a next act, the distribution of the motion data in k-space is analyzed and a metric of variation of the motion data is calculated. The metric of variation is the result of the analysis of the motion data. It reflects the distribution of the motion data in k-space, in particular along the phase conceding direction(s). If the patient has moved, the motion data will contain different motion states, and the metric of variation is low if the different motion states are spread homogeneously over the k-space, and high if the k-space lines acquired during each motion state are adjacent to one another.

The analysis may include filtering of the motion data with respect to the phase encoding direction(s), for example applying a band pass filter or a low pass filter. The filtering may also include applying a kernel to the motion data. Thereby, the motion data may be spread over several points in the phase encoding direction(s).

The analysis may further include calculating a metric of variation, wherein the metric of variation may be calculated from the filtered motion data.

According to an embodiment, the motion data is first low-pass (LP) filtered with respect to the phase encoding direction. This serves to provide that the metric stays low if motion occurs, but the k-space lines affected by the motion are well distributed over the k-space. The metric of variation may be computed as the sum of the metrics of variation for each motion parameter (e.g., each of the three translational and three rotational parameters) parameter of the motion states.

The metric of variation may be any metric known from statistics to determine an amount of variation among a set of values. The metric of variation may be the variance. It may also be the standard deviation, the standard error, or the interquartile range (IQR). Another measure for the amount of variation may be the maximum amplitude, e.g., the difference between the highest and the lowest value among the set of values.

The metric of variation, also referred to as motion variance metric, may for example be calculated as the sum of variances (Var) of each motion parameter $\theta_i$, where i designates the components (e.g., 3 translational and 3 rotational components) of the motion:

$$\text{Metric of variation} = \sum_{i=1}^{6} \text{Var}(LP(\theta_i(k_y)))$$

This motion variance metric is easy-to-compute and requires little computational footprint. The disclosure has discovered that it reflects motion sensitivity. The aim is thus to keep it as low as possible.

Therefore, in a next act, the positions of the k-space lines of a next part of k-space to be acquired in the imaging protocol are selected, depending on the metric of variation. In particular, the temporal order in which further shots required for completing the imaging protocol are acquired may be permutated. The positions of the k-space lines of the next part of k-space may be chosen so that the motion variance metric calculated for the motion trajectory during the whole imaging protocol will be kept as low as possible. For example, in the case of step motion, hierarchical ordering shows better RMSE when compared to the ground truth than sequential ordering. This is predicted by the metric of variation as calculated in act (d) of the method, which is 3× smaller.

According to an embodiment, acts (a) to (e) are repeated for the next and further parts of k-space, in particular until the imaging protocol is completed. In other words, once the positions or the k-space lines of the next part of k-space have been determined, the next part of k-space is acquired. As before, a subject motion trajectory including motion data of the subject during the acquisition of that part of k-space is determined, e.g., estimated using the SAMER method. The motion data is analyzed, and a metric of variation is calculated. The subject motion trajectory used may be the complete subject motion trajectory held by the subject during the acquisition so far (e.g., relating to the first and the next part of k-space), or it may be only the trajectory of the last motion states, e.g. the motion states held during the acquisition of the next part of k-space. The subject motion trajectory used may also be the complete subject motion trajectory during the complete imaging protocol, wherein the future motion data (e.g., motion states) are extrapolated from the last held motion data (e.g., motion state), in particular they are set to the same values.

The next part of k-space may include as many k-space lines as the first part. The next part may also include k-space lines equidistantly spaced from each other. Each part of k-space may be acquired in one shot. Once the motion trajectory has been analyzed, the metric of variation is calculated again, and the positions of the k-space lines of a further next part of k-space are selected, depending on the metric of variation. Acts (a) to (e) are then repeated again. This is done until the last part of k-space has been sampled in act (a), so that the imaging protocol is completed.

The acquired k-space data may then be reconstructed using an algorithm using retrospective motion correction.

According to an embodiment, the imaging protocol includes a plurality of echo trains, wherein several k-space lines are acquired in one echo train. A fixed number of k-space lines may be acquired in each echo train. Each part of k-space may be acquired in one or several, (e.g., in one), echo train. An "echo train," also referred to as "shot," includes a plurality of magnetic resonance (MR) echoes, e.g., spin echoes and/or gradient echoes. During each echo, a k-space line is acquired. In most sequences, an echo train includes a preparation pulse, and then all echoes have their own excitation/refocusing pulses. Thus, an echo train may mean a series of gradient echoes or spin echoes, each echo corresponding to one line in k-space. An echo train may include one or several sub echo trains, wherein a separate image may be acquired in each sub echo train, e.g., as in MP2RAGE. There may be 8 to 512 echoes in one echo train. For example, in 2D TSE sequences, an echo train may contain less than 40 echoes or less than 30 echoes. The imaging protocol may use a multi-shot method, in which a part of k-space is sampled in one shot. The imaging protocol may include between 5 and 30 shots in case of a 2D sequence.

According to an embodiment, the subject motion trajectory includes all motion data or states of the subject, which were determined for k-space lines acquired so far. According to an alternative embodiment, the subject motion trajectory includes all motion data of the subject, which are associated with the complete k-space of the imaging protocol. In this embodiment, the metric of variation may be calculated for the complete motion data which may be determined for the duration of the imaging protocol, wherein the motion data corresponding to k-space lines which have not yet been acquired may be extrapolated from the last determined motion data or motion state, and/or they may be set to a fixed number. In particular, all future motion data may be equated to the most recently determined motion state or data. This allows the calculation of motion variance metrics for several or even all possible different sampling orders, e.g., different shot orders.

According to an embodiment, the metric of variation calculated from the subject motion trajectory of all motion data that may be determined for the duration of the imaging protocol is calculated for several or all possible sampling orders in which the k-space lines of the next and further parts of k-space may be acquired. The sampling order having the lowest metric of variation is then selected for sampling the next part of k-space. In this embodiment, the positions of the k-space lines of the next part of k-space may thus be selected by assuming that the last determined motion state will be held throughout the rest of the imaging protocol, associating each motion state with the position of the k-space lines which have been sampled or which will be sampled during that motion state, for several sampling orders or, e.g., for each possible sampling order, and performing acts (c) and (d) for several sampling orders or each possible sampling order. For the next part of k-space, the sampling order having the lowest metric of variation is chosen. This embodiment may be carried out if the imaging protocol includes a relatively low number of shots, e.g., less than 30 shots, and each shot is associated with one motion state. Each part of k-space may be acquired in one shot. In this case, the number of possible permutations of the order in which the shots (corresponding to the parts of k-space) are acquired is so low that the metric of variation may be calculated for all possible permutations or sampling orders.

According to an alternative embodiment, the positions of the k-space lines of the next part of k-space are selected to be adjacent to the positions of the k-space lines of the first part of k-space when the metric of variation calculated for the subject motion trajectory associated with the k-space lines acquired so far is below a pre-determined first threshold. Thereby, a sequential ordering may be used when the motion variance metric is low, as would be the case, for example, for a periodic motion such as breathing. It has been shown that sequential ordering gives the best results in this situation.

The positions of the k-space lines of the next part of k-space may be selected to be as far as possible away from the positions of the k-space lines of the first part of k-space when the metric of variation calculated for the subject motion trajectory associated with the k-space lines acquired so far is above a pre-determined second threshold, wherein the second threshold may be the same as the first threshold. Thereby, a hierarchical ordering may be used when the motion variance metric is high, as would be the case for example for a step motion, where the subject has moved once. It has been shown that hierarchical ordering gives the best results in this situation. In this embodiment, the sampling order may thus switch between hierarchical and sequential, depending on the type of motion detected.

According to an embodiment, the k-space lines of each part of k-space, in particular of each echo train, are distributed over the at least one phase encoding direction, in particular equidistantly. This may be the case in a number of standard imaging protocol sequences, (e.g., in TSE, such as 2D TSE), in order to achieve the desired contrast. This results in the possibility of gaps in k-space caused by motion, which is why the method may be used to considerable advantage in imaging protocols where the k-space lines in each echo train are thus distributed over k-space.

According to an embodiment, each echo train corresponds to one time point, for which motion data is determined. For example, one motion state, (e.g., a rigid motion state), is determined for each echo train. Thereby, the amount of motion data, (e.g., the number of motion states), is held at an acceptable level for the computation of the metric of variation. Further, this allows the use of the SAMER technique and other retrospective motion estimation methods which estimate one motion state per shot.

According to an embodiment, the magnetic resonance image dataset is a two-dimensional image dataset. Thereby, the number of echo trains in which the image is acquired may be sufficiently low to allow a calculation of the metric of variation for all possible sampling orders. However, the method is also applicable to 2D image datasets.

In an embodiment, the imaging protocol uses a parallel imaging technique, in which the phase encoding direction(s) is/are subsampled by a predetermined acceleration factor, and the image dataset is acquired using a multi-channel coil array. Accordingly, the subsampling pattern may be incorporated into the forward model, e.g., a so-called a "SENSE+ motion" model.

According to an embodiment, a set of additional k-space lines within a central region of k-space is acquired at least once in each echo train in more than 85% of the echo trains, wherein the additional k-space lines are acquired in addition to those that are required under the imaging protocol to acquire the magnetic resonance image dataset, and wherein the additional k-space lines are used to determine the motion state, (e.g., the motion parameters or position), of the subject during each echo train. This allows efficient retrospective motion estimation, in particular of one motion state for each echo train. The additional k-space lines are therefore also referred to as "guidance lines." "Additional" means that the k-space lines are acquired in addition to those that are required under the imaging protocol to acquire an MR image, e.g., they are redundant when it comes to image reconstruction. The position of the additional k-space lines is within a central region of k-space, because low-frequency k-space information better captures the effects patient motion than information from the k-space periphery. According to an embodiment, 2 to 16 or 2 to 8 additional k-space lines are included in each set of additional k-space lines.

According to an embodiment, the imaging protocol includes acquiring a low-resolution scout image of the subject, wherein the motion states of the subject are determined by comparing the additional k-space lines, or the k-space lines of each shot which lie within the central region, with the low-resolution scout image. This further improves motion estimation using the SAMER method. Similar to the central region of k-space, the low-resolution scout images may have a spatial resolution of 2-8 mm, 3-5 mm, or 4 mm in the phase-encoding direction(s).

The disclosure also relates to a method for generating a motion-corrected MRI dataset of an object from k-space data acquired using the acquisition method as described herein. The method includes estimating the motion-corrected image dataset by minimizing the data consistency error between the k-space data acquired in the imaging protocol and a forward model described by an encoding matrix, wherein the encoding matrix includes a subject motion trajectory of the subject ($\theta_t$), Fourier encoding, and optionally subsampling and/or coil sensitivities of a multi-channel coil array.

In an embodiment, the method includes receiving k-space data acquired using the acquisition method described herein and receiving at least one low-resolution scout image of the object. Additionally, in one act, the method includes estimating motion parameters for each set of additional k-space lines by comparing the respective additional k-space lines with or against the at least one scout image. In an additional act, the method includes estimating the motion-corrected image dataset by minimizing the data consistency error between the k-space data acquired in the imaging protocol and a forward model described by an encoding matrix, wherein the encoding matrix includes the motion parameters for each set of additional k-space lines, Fourier encoding, and optionally subsampling and/or coil sensitivities of a multi-channel coil array.

Thus, the minimization problem may be carried out in two acts. In a first act, motion parameters (which may be rigid-body motion parameters or non-rigid motion parameters) are estimated for each set of guidance lines by comparison with the corresponding image. In a second act, the motion-corrected image is estimated using the motion parameters estimated in the first act. Thereby, alternating repeated updates of the otherwise coupled optimization variables x (image vector) and θ (motion parameters) is avoided. Rather, this embodiment uses the rapid scout image(s) as an image estimate $\tilde{x}$. This leads to a highly efficient optimization problem that is fully separable across the shots and does not require repeated updates of x, which may include millions of imaging voxels. The minimization problem may be derived from a SENSE parallel imaging forward model, as described in K. P. Pruessmann et al., "SENSE: sensitivity encoding for fast MRI," Magn. Reson. Med., vol. 42, no. 5, pp. 952-962, 1999, with rigid body motion parameters included ("SENSE+motion").

In a further aspect, a magnetic resonance imaging apparatus is provided which includes a radio frequency controller configured to drive an RF-coil, e.g., including a multi-channel coil-array, a gradient controller configured to control gradient coils, and a control unit configured to control the radio frequency controller and the gradient controller to execute the imaging protocol according to the disclosure. The MRI-apparatus may be a commercially available MRI-apparatus which has been programmed to perform the method of the disclosure. For example, it may be 3 T scanner like the MAGNETOM Vida of SIEMENS Healthcare, Erlangen, Germany. A multi-channel coil array may be a 32-channel head coil but may also be a coil array for spine-imaging.

According to a further aspect, a computer configured to generate a motion-corrected magnetic resonance image dataset is provided. The computer may be any computer including a sufficiently powerful processing unit, which may be a CPU or GPU, or several such processing units. Accordingly, the computer may be a PC, a server, a console of an MRI apparatus, but it also may be a computer that is remote from the MRI apparatus, it may be connected with it through the Internet. Accordingly, the computer may also be a cloud computer, a remote server, etc. The computer may also be a mobile device, such as a laptop, tablet computer, or mobile phone.

According to a further aspect, a computer program is provided which includes program code, which causes a magnetic resonance imaging apparatus (such as the apparatus described herein) to execute the method, in particular the method for acquiring an MR image dataset. However, the program code may also encode the described method for generating a motion-corrected magnetic resonance image dataset, and which program code may run on a computer as described herein.

According to a further aspect, the disclosure is directed to a non-transitory computer-readable medium containing a computer program as described herein. The computer-readable medium may be any digital storage medium, such as a hard disc, a cloud, an optical medium such as a CD or DVD, a memory card such as a compact flash, memory stick, a USB-stick, multimedia stick, secure digital memory card (SD), etc.

All features disclosed with regard to the acquisition method may be combined with all features of method for generating a motion-corrected MRI dataset and vice versa. Also, all features of the disclosed methods may be embodied in the MRI apparatus, computer program and computer-readable storage medium according to other aspects of the disclosure and vice versa.

BRIEF DESCRIPTION OF THE DRAWINGS

The accompanying drawings illustrate various example embodiments of various aspects of the disclosure.

FIG. 4 is an illustration of an example of an alternating optimization algorithm.

FIG. 5 is an illustration of an example of a SAMER optimization.

Similar elements are designated with the same reference signs in the drawings.

DETAILED DESCRIPTION

Figure 1:
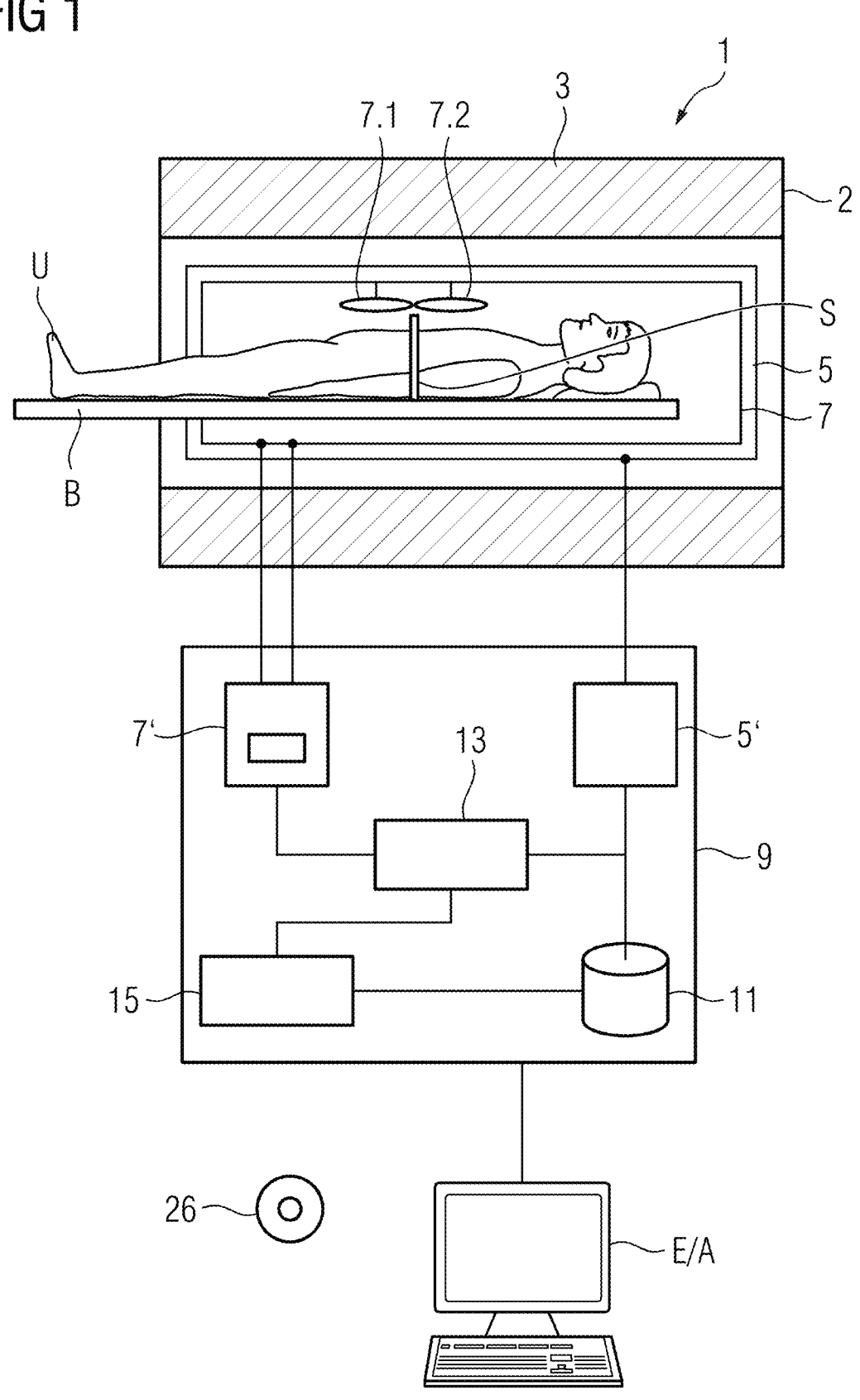
FIG. 1 is a schematic representation of an MRI apparatus according to an embodiment.

FIG. 1 schematically shows a magnetic resonance (MR) apparatus 1. The MR apparatus 1 has an MR data acquisition scanner 2 with a magnet 3 that generates the constant magnetic field, a gradient coil arrangement 5 that generates the gradient fields, one or several radio-frequency (RF) antennas 7 for radiating and receiving RF signals, and a control computer 9 configured to perform the method as described herein. The radio-frequency antennas 7 may include a multi-channel coil array including at least two coils, (e.g., the schematically shown coils 7.1 and 7.2), which may be configured to transmit and/or receive RF signals (MR signals).

In order to acquire MR data from an examination subject U, (e.g., a patient or a phantom), the subject U is introduced on a bed B into the measurement volume of the scanner 2. MR data may be acquired using a method according to an embodiment from 2D slice S. The control computer 9 controls the MR apparatus 1, and the gradient coil arrangement 5 with a gradient controller 5' and the RF antenna 7 with a RF transmit/receive controller 7'. The RF antenna 7 has multiple channels corresponding to the multiple coils 7.1, 7.2 of the coil arrays, in which signals may be transmitted or received. The control computer 9 also has an imaging protocol processor 15 that determines the imaging protocol, including the sampling order. A control unit 13 of the control computer 9 is configured to execute all the controls and computation operations required for acquisitions. Intermediate results and final results required for this purpose or determined in the process may be stored in a memory 11 of the control computer 9. A user may enter control commands and/or view displayed results, (e.g., image data), via an input/output interface E/A. A non-transitory data storage medium 26 may be loaded into the control computer 9 and may be encoded with programming instructions (e.g., program code) that cause the control computer 9, and the various functional units thereof described above, to implement any or all embodiments of the method.

Figure 2:
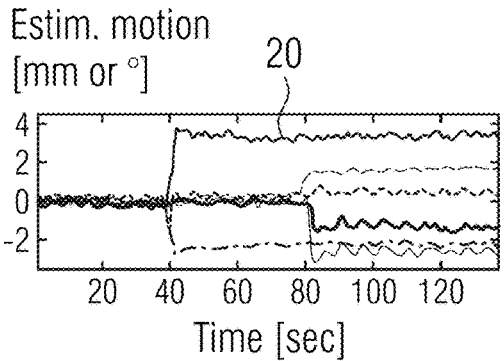
FIG. 2 is a representation of examples of motion trajectories showing step motion (left) and periodic motion (right).
Figure 2:
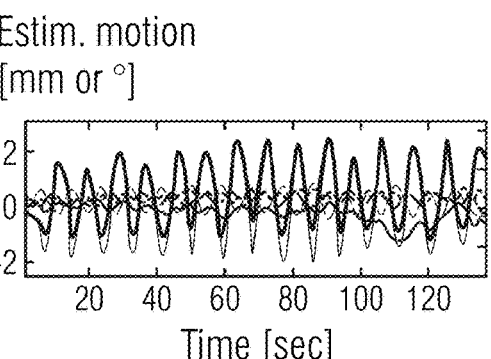

FIG. 2 illustrates motion trajectories 20 of different types of motion, and in particular step motion (left) and nodding motion (right), in which a subject was instructed to nod in a "yes" type pattern to mimic breathing motion. The depicted motion states are rigid motion states, each including 6 parameters, three translational and three rotational parameters. The 6 parameters are plotted in the graphs against time.

Figure 3:
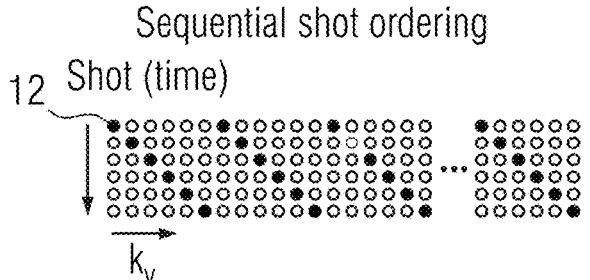
FIG. 3 is a schematic representation of examples of sequential (left) and hierarchical (right) shot ordering.
Figure 3:
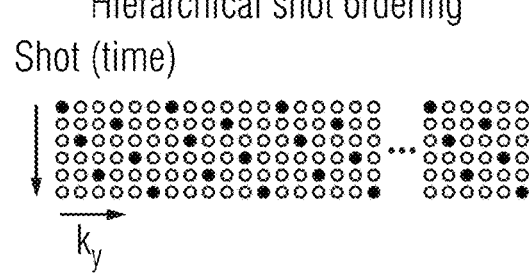

FIG. 3 illustrates a sequential shot ordering (left) and a hierarchical shot ordering (right) for 2D TSE. The phase encoding direction is represented as $k_y$, and the shots are represented on the vertical axis which also represents time. Each k-space line 12 is represented by a circle, wherein the filled circles represent the k-space lines which are being sampled in the respective shot. In both shot orderings, the first shot (echo train) is the same. In the first echo train, the $1^{st}$, $7^{th}$, $13^{th}$, $19^{th}$, . . . , up to e.g. the $61^{st}$ k-space line 12 is acquired. In sequential shot ordering, the second shot (shown in the line below the first shot) samples the adjacent k-space lines, e.g., the $2^{nd}$, $8^{th}$, $14^{th}$, $20^{th}$ line, etc. Thereby, k-space is read out sequentially. In the hierarchical shot ordering, the second echo train samples k-space lines which are as far as possible away from the k-space lines acquired in the first shot, in this case the $4^{th}$, $10^{th}$, $16^{th}$ line, etc. The next shot fills the gaps between the k-space lines acquired in the first and second shot.

A retrospective motion correction technique which may be used on the MR signals acquired with the acquisition method, and especially to estimate the motion states, will now be described with reference to FIGS. 4 and 5. The mathematical model used is an extension of SENSE parallel imaging, as described in the above-cited paper by K. P. Pruessmann et al., with rigid-body motion parameters included into the forward model. The forward model or encoding operator $E_\theta$ for a given patient motion vector $\theta$ (including motion parameters over time) relates the motion-free image x to the acquired multi-channel k-space data s. At each time point i that is considered, e.g., the acquisition time of the sets of guidance lines, the subject's position is described by a new set of six rigid-body motion parameters $\theta_i$ that describe the 3D position of the object. Accordingly, the multi-channel k-space data $s_i$ acquired at time point i may be related to the 3D image volume x through image rotations $R_i$, image translations $T_i$, coil sensitivity maps C, Fourier operator F and under-sampling mask $M_i$ by the following formula 1:

$$s_i = E_{\theta_i} x = M_i F C T_{\theta_i} R_{\theta_i} x \qquad [1]$$

In prior art methods, as illustrated in FIG. 4, both the motion corrected image vector x and the motion vector (trajectory) $\theta$ are estimated by performing an alternating, repeated optimization between the image vector (formula 2) and the motion vector (formula 3):

$$[\hat{x}] = \mathrm{argmin}_x \left\| E_{\hat{\theta}} x - s \right\|_2 \qquad [2]$$

$$[\hat{\theta}] = \mathrm{argmin}_\theta \| E_\theta \hat{x} - s \|_2 \qquad [3]$$

This may lead to convergence issues as updates of x and $\theta$ will be computed on inaccurate information. Moreover, the reconstruction is computationally demanding as repeated updates of x (millions of imaging voxels) are needed.

Using one or several ultra-fast low-resolution scout scans 52, the motion trajectory may be directly estimated, as illustrated in FIG. 5, thus avoiding the time-consuming alternate optimization. The scout image 52, designated by $\tilde{x}$, approximates the motion-free image volume $\hat{x}$ and each motion state may be determined independently by minimizing the data consistency error of the forward model:

$$[\hat{\theta}_i] = \mathrm{argmin}_{\theta_i} \left\| E_{\theta_i} \tilde{x} - s_i \right\|_2 \qquad [4]$$

In the method, the guidance lines may be used instead of or in addition to the k-space data s in this first act of the optimization. In certain examples, only the guidance lines are used. Where several scout images are acquired, the scout image $\tilde{x}$ having the same contrast as the respective guidance lines may be used for the estimation of the motion parameters $\theta$ relating to the time points of those guidance lines. In one embodiment, the intra-shot patient motion may be estimated from the calibration data by repeating the SAMER optimization for each set of guidance lines separately. Alternatively, a joint optimization across all calibration data may be performed, whereby the time of acquisition of each calibration sample is taken into account.

For the final image reconstruction, the intra-shot motion states from each shot are combined and the motion-mitigated image is obtained from solving a standard least-squares problem:

$$[\hat{x}] = \mathrm{argmin}_x \left\| E_{\hat{\theta}} x - s \right\|_2 \qquad [5]$$

This strategy completely avoids the difficult non-linear and non-convex joint optimization that contains millions of unknowns, as it only considers six rigid body parameters per motion optimization, and it does not require computationally costly full or partial updates to the image.

Figure 6:
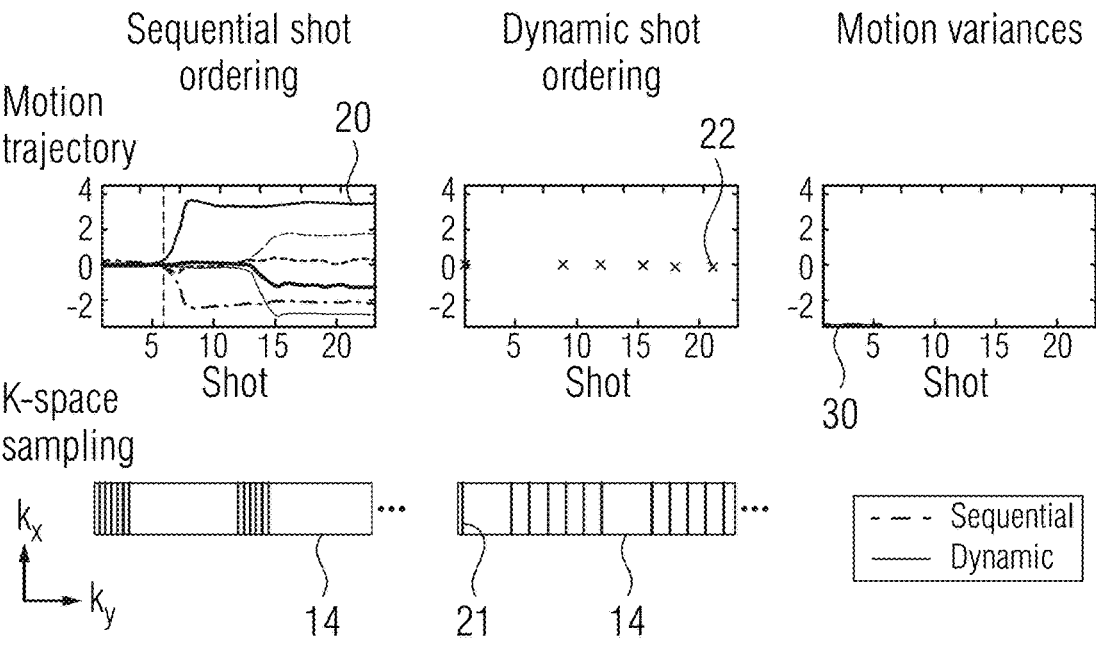
FIG. 6 is an illustration of an embodiment of the method, showing the motion trajectory and sampled k-space lines in sequential and dynamic shot ordering, as well as the motion variances of sequential and dynamic shot ordering after shot no. 6.

FIG. 6 is an illustration of dynamic shot ordering according to an embodiment. The example concerns a 2D TSE imaging protocol. The graph on the top left shows the motion trajectory 20, in this case a step-type motion. In the case of a sequential shot ordering, the motion trajectory shown on the top left corresponds to the motion states 22 associated with their position in the phase encoding direction. The sequential shot ordering is illustrated on the bottom left, which shows the k-space plane 14 and the k-space lines 21 that have already been sampled. In FIG. 6, 6 echo trains have already been acquired.

The two graphs in the middle illustrate the acquisition in case of dynamic shot ordering according to an embodiment. For the first 6 shots, this corresponds to a hierarchical shot ordering. The motion states 22 associated with their position in the phase encoding direction are shown in the top graph, and the sampling order is illustrated in the graph below, which depicts the k-space lines 21 that have already been acquired in a k-space plane 14.

The graph on the right depicts the motion variance metric that is calculated for both possible shot orderings, the sequential (left) and dynamic shot ordering. After the $6^{th}$ shot, both motion variance metrics are the same since no motion has occurred yet.

According to an embodiment, the SAMER method is used in order to estimate motion states for each shot that has been acquired, immediately after it has been acquired ("on-the-fly"). The most recent motion estimate is used to estimate which remaining shot position is most likely to reduce the temporal motion variance, e.g., which will result in the lowest motion variance metric, and that shot ordering is selected according, which is referred to as dynamic shot ordering.

Figure 7:
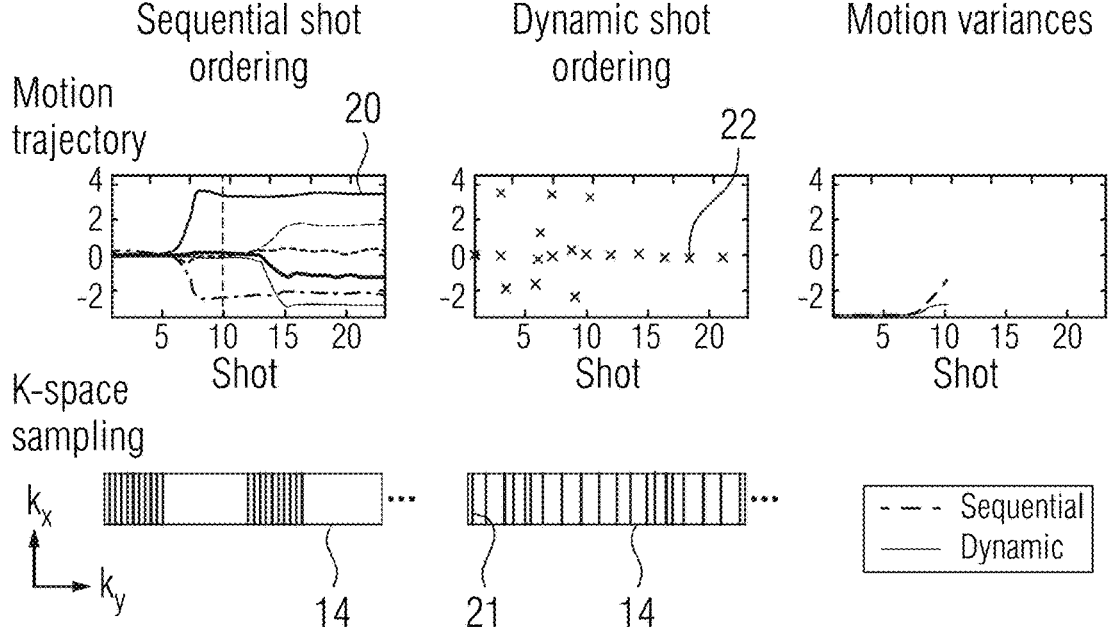
FIG. 7 is an illustration of an embodiment of the method, showing the motion trajectory and the sampled k-space lines in sequential and dynamic shot ordering, as well as the motion variances of sequential and dynamic shot ordering after shot no. 10.

FIG. 7 illustrates the situation after 10 shots, when a step motion has already occurred. The motion variance metric calculated for the sequential shot ordering has increased sharply after the motion. By contrast, the motion variance metric for the dynamic shot ordering has increased to a lesser extent. This is because the motion states are re-distributed according to the dynamically selected shot-order, as shown in the top middle graph. If the motion states represented here are low-pass filtered, the motion variance metric will be reduced.

Figure 8:
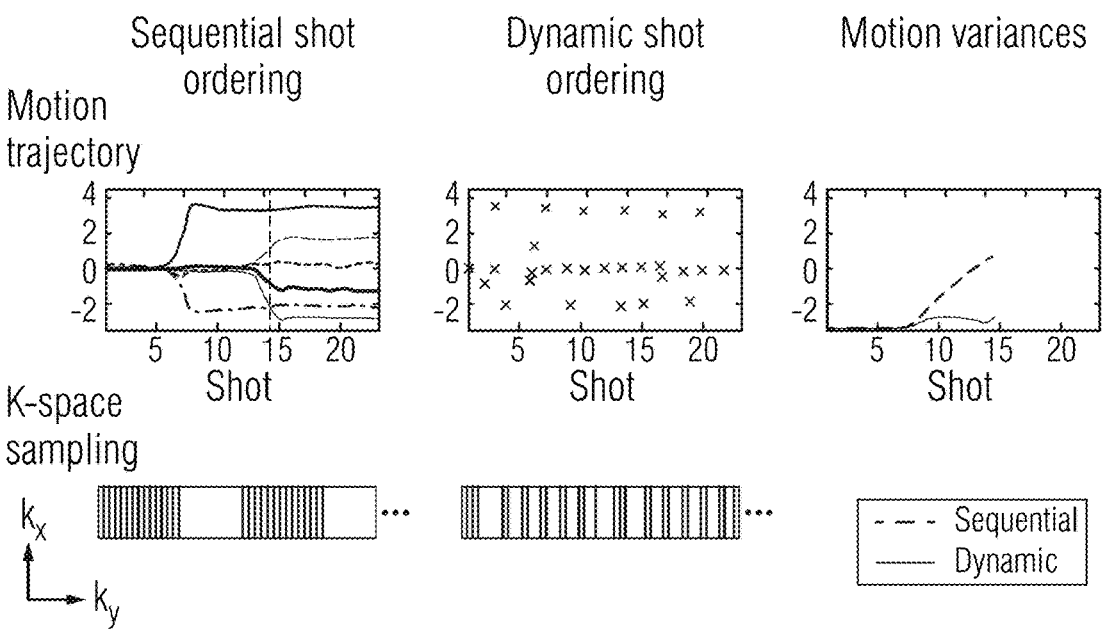
FIG. 8 is an illustration of an embodiment of the method, showing the motion trajectory and the sampled k-space lines in sequential and dynamic shot ordering, as well as the motion variances of sequential and dynamic shot ordering after shot no. 14.

FIG. 8 illustrates the situation after 14 shots, wherein the motion variance metric calculated for a sequential shot ordering has further increased. By contrast, the motion variance metric for the dynamic shot ordering illustrated in the middle is still low. This is because the dynamic shot ordering results in the different motion states being better distributed across the phase encoding direction.

Figure 9:
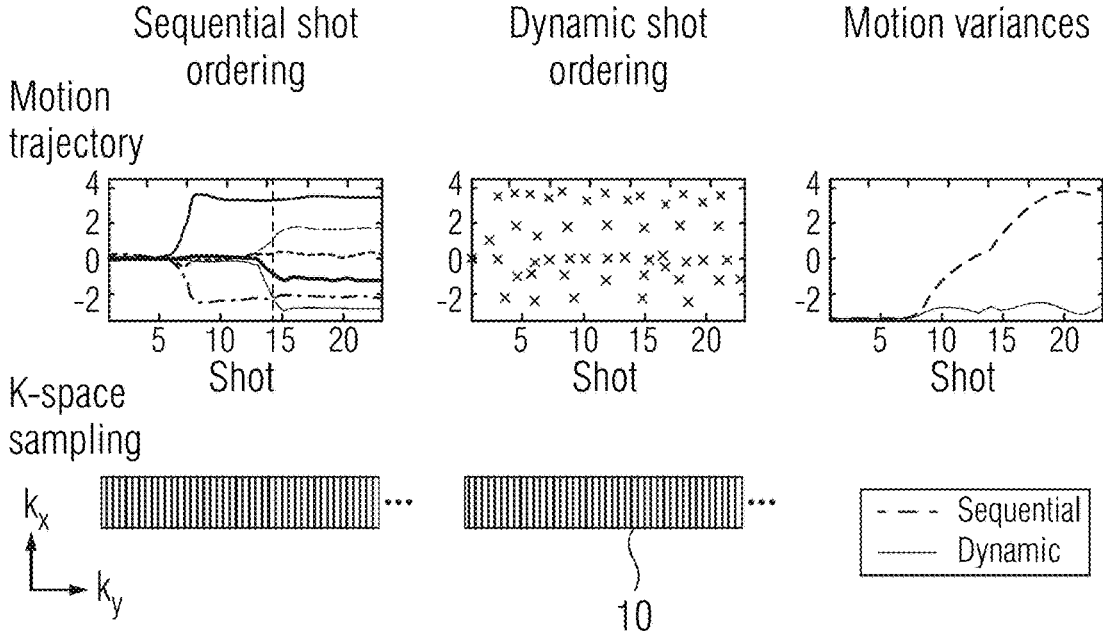
FIG. 9 is an illustration of an embodiment of the method, showing the motion trajectory and the sampled k-space lines in sequential and dynamic shot ordering, as well as the motion variances of sequential and dynamic shot ordering after shot no. 25.

After 25 shots, the imaging protocol is completed (FIG. 9), the k-space 10 has been completely sampled, and one may see that the motion variance metric calculated for a sequential shot ordering has further increased, while the motion variance metric for the dynamic shot ordering illustrated in the middle is still low. Thus, the dynamic shot ordering is expected to significantly reduce any remaining motion artefacts after image reconstruction and retrospective motion correction as described herein.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for acquiring a magnetic resonance image dataset of a subject using an imaging protocol in which spatial encoding is performed using phase encoding gradients along at least one spatial direction and frequency encoding gradients along another spatial direction, wherein k-space is sampled during the acquiring in a plurality of k-space lines oriented along a frequency encoding direction and having different positions in at least one phase encoding direction, the method comprising:

sampling a first part of k-space by acquiring a number of k-space lines under the imaging protocol;

determining a subject motion trajectory comprising motion data of the subject at one or several time points during the acquiring;

associating the motion data with the different positions along the at least one phase encoding direction of the k-space lines acquired at the time points of the motion data;

analyzing a distribution of the motion data in k-space and calculating a metric of variation of the motion data; and selecting positions of the k-space lines of a next part of k-space to be acquired in the imaging protocol, depending on the metric of variation.

2. The method of claim 1, wherein the sampling, the determining, the associating, the analyzing, and the selecting are repeated for a next and further parts of k-space until the imaging protocol is completed.

3. The method of claim 1, wherein the analyzing of the distribution of the motion data comprises:

low-pass filtering the motion data with respect to the at least one phase encoding direction to provide low-pass filtered motion data; and calculating a metric of variation of the low-pass filtered motion data.

4. The method of claim 1, wherein the imaging protocol comprises a plurality of echo trains, wherein several k-space lines are acquired in one echo train, and wherein each part of the k-space is acquired in one or several echo trains.

5. The method of claim 1, wherein the metric of variation is calculated for the subject motion trajectory comprising all motion data configured to be determined for a duration of the imaging protocol, and wherein the motion data corresponding to k-space lines not yet been acquired are set to a fixed number.

6. The method of claim 5, wherein the metric of variation is calculated for several sampling orders or all possible sampling orders in which the k-space lines of a next and further parts of k-space are configured to be acquired, and wherein a sampling order having a lowest metric of variation is selected.

7. The method of claim 1, wherein the positions of the k-space lines of the next part of k-space are selected to be adjacent to positions of the k-space lines of the first part of k-space when the metric of variation calculated for the subject motion trajectory associated with the k-space lines acquired so far is below a pre-determined first threshold.

8. The method of claim 7, wherein the positions of the k-space lines of the next part of k-space are selected to be as far as possible away from the positions of the k-space lines of the first part of k-space when the metric of variation calculated for the subject motion trajectory associated with the k-space lines acquired so far is above a pre-determined second threshold, and wherein the pre-determined second threshold is equal to the pre-determined first threshold.

9. The method of claim 1, wherein the k-space lines of each part of k-space are distributed over the at least one phase encoding direction.

10. The method of claim 1, wherein each echo train of each part of k-space is equidistantly distributed over the at least one phase encoding direction.

11. The method of claim 1, wherein the subject motion trajectory includes motion data of the subject that were determined for k-space lines acquired so far.

12. The method of claim 1, wherein the imaging protocol comprises a plurality of echo trains, wherein a set of additional k-space lines within a central region of k-space is acquired at least once in each echo train in more than 85% of the plurality of echo trains, wherein the additional k-space lines are acquired in addition to those that are required under the imaging protocol to acquire the magnetic resonance image dataset, and wherein the additional k-space lines are used to determine the motion data of the subject during each echo train.

13. The method of claim 1, wherein the imaging protocol comprises acquiring a low-resolution scout image of the subject, and wherein the motion data of the subject is determined by comparing the low-resolution scout image with (1)

additional k-space lines or (2) the k-space lines of each shot that lie within a central region.

14. A method for generating a motion-corrected magnetic resonance image dataset of a subject, the method comprising:

receiving k-space data acquired using an acquisition method; and estimating the motion-corrected magnetic resonance image dataset by minimizing a data consistency error between the k-space data acquired in an imaging protocol and a forward model described by an encoding matrix, wherein the encoding matrix comprises a subject motion trajectory of the subject and Fourier encoding, and wherein the acquisition method of the k-space data comprises:

sampling a first part of k-space by acquiring a number of k-space lines under the imaging protocol in which spatial encoding is performed using phase encoding gradients along at least one spatial direction and frequency encoding gradients along another spatial direction, wherein the first part of k-space is sampled in a plurality of k-space lines oriented along a frequency encoding direction and having different positions in at least one phase encoding direction;

determining the subject motion trajectory comprising motion data of the subject at one or several time points during the acquisition of the number of k-space lines;

associating the motion data with the different positions along the at least one phase encoding direction of the k-space lines acquired at the time points of the motion data;

analyzing a distribution of the motion data in k-space and calculating a metric of variation of the motion data; and selecting positions of the k-space lines of a next part of k-space to be acquired in the imaging protocol, depending on the metric of variation.

15. The method of claim 14, wherein the encoding matrix further comprises subsampling and/or coil sensitivities of a multi-channel coil array.

16. A magnetic resonance imaging apparatus comprising: a control computer having at least one processor configured to:

sample a first part of k-space by acquiring a number of k-space lines under an imaging protocol in which spatial encoding is performed using phase encoding gradients along at least one spatial direction and frequency encoding gradients along another spatial direction, wherein the first part of k-space is sampled in a plurality of k-space lines oriented along a frequency encoding direction and having different positions in at least one phase encoding direction;

determine a subject motion trajectory comprising motion data of a subject at one or several time points during the acquisition;

associate the motion data with the different positions along the at least one phase encoding direction of the k-space lines acquired at the time points of the motion data;

analyze a distribution of the motion data in k-space and calculating a metric of variation of the motion data; and select positions of the k-space lines of a next part of k-space to be acquired in the imaging protocol, depending on the metric of variation.

* * * * *